United States Patent
Hom et al.

(10) Patent No.: US 12,466,291 B1
(45) Date of Patent: Nov. 11, 2025

(54) MULTI-BATTERY CHARGING STATION WHICH PROVIDES BATTERY-SPECIFIC CHARGING PARAMETERS

(71) Applicant: Wisk Aero LLC, Mountain View, CA (US)

(72) Inventors: Lewis Romeo Hom, Mountain View, CA (US); Carlos Cardona, Mountain View, CA (US); Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 656 days.

(21) Appl. No.: 17/893,527

(22) Filed: Aug. 23, 2022

Related U.S. Application Data

(60) Provisional application No. 63/236,027, filed on Aug. 23, 2021.

(51) Int. Cl.
| | | |
|---|---|---|
| *B60L 58/18* | (2019.01) | |
| *B60L 53/22* | (2019.01) | |
| *B60L 53/62* | (2019.01) | |
| *B60L 58/12* | (2019.01) | |
| *G01R 31/396* | (2019.01) | |
| *H02J 7/00* | (2006.01) | |

(52) U.S. Cl.
CPC ............... *B60L 58/18* (2019.02); *B60L 53/22* (2019.02); *B60L 53/62* (2019.02); *B60L 58/12* (2019.02); *G01R 31/396* (2019.01); *H02J 7/0013* (2013.01); *B60L 2200/10* (2013.01)

(58) Field of Classification Search
CPC .......... B60L 58/18; B60L 53/22; B60L 53/62; B60L 58/12; B60L 2200/10; G01R 31/396; H02J 7/0013

USPC ......................................................... 320/109
See application file for complete search history.

(56) References Cited

U.S. PATENT DOCUMENTS

| | | | |
|---|---|---|---|
| 8,485,464 | B2 | 7/2013 | Kroo |
| 8,733,690 | B2 | 5/2014 | Bevirt et al. |
| 9,764,833 | B1 | 9/2017 | Tighe et al. |
| 10,110,033 | B1 | 10/2018 | Hom et al. |
| 10,333,328 | B1 | 6/2019 | Hom et al. |

(Continued)

FOREIGN PATENT DOCUMENTS

EP      3251882 B1    4/2019

OTHER PUBLICATIONS

"Archer Aviation Inc's Invalidity Contentions", Case No. 3:21-CV-02450-WHO, Oct. 11, 2021, 42 pages.

(Continued)

*Primary Examiner* — Paul Dinh
(74) *Attorney, Agent, or Firm* — Kilpatrick Townsend & Stockton LLP

(57) ABSTRACT

Embodiments of the invention are directed to methods and systems for providing electric power with individualized charging parameters to each battery in a multi-battery system. Electric power from the single power source can be distributed in a controlled and unequal manner. Custom charging parameters can be designed for each battery. The custom charging parameters can be determined based on battery metrics gathered for that battery, and can be designed to optimize for a number of suitable priorities, such as recharging speed and battery health. As a result, each battery can be recharged according to individual needs.

14 Claims, 8 Drawing Sheets

| | 470 | 472 | 474 | 486 |
|---|---|---|---|---|
| 476 — Battery Sub-Module 1 | $T_1$ | $SOC_1$ | $V_{cell,max,1}$ | $V_{cell,min,1}$ |
| ⋮ | ⋮ | ⋮ | ⋮ | ⋮ |
| 478 — Battery Sub-Module N | $T_N$ | $SOC_N$ | $V_{cell,max,N}$ | $V_{cell,min,N}$ |

(56) References Cited

U.S. PATENT DOCUMENTS

| | | | |
|---|---|---|---|
| 10,673,252 | B2 | 6/2020 | Hom et al. |
| 10,868,430 | B1 | 12/2020 | Hom et al. |
| 2004/0107013 | A1 | 6/2004 | Fuller et al. |
| 2011/0254502 | A1 | 10/2011 | Yount et al. |
| 2013/0015819 | A1 | 1/2013 | Nakashima et al. |
| 2013/0126680 | A1 | 5/2013 | Hamke et al. |
| 2016/0244158 | A1 | 8/2016 | Fredericks et al. |
| 2017/0353042 | A1 | 12/2017 | Liu |
| 2018/0339595 | A1 | 11/2018 | Chang |
| 2022/0115878 | A1* | 4/2022 | Khozikov ............. B60L 3/0046 |
| 2022/0115897 | A1* | 4/2022 | Ijaz ..................... H01M 10/441 |

OTHER PUBLICATIONS

"Battery Charger Multi XS 25000, XS 25000 Multi XT 14000, XT 14000", CTEK, Available Online at: https://docs.rs-online.com/15d2/0900766b81335f57.pdf, Feb. 27, 2020, 8 pages.

"Li-Ion BMS Cell-Board Processor", Lithiumate EL01, 2011, 14 pages.

"Li-Ion BMS Controller Processor", Lithiumate EL02, 2011, 9 pages.

"Lithium Ion Battery Monitoring System", Analog Devices AD7280A, 2011, 48 pages.

"Lithium Power BMS Manual", GTBMS005A-MC8, Harbin Guantuo Power Equipment Co., Ltd., Jul. 22, 2009, 12 pages.

"Owner's Guide : RXV Elite Freedom", EZGO: A Textron Company, 2017, 60 pages.

"Pipistrel Alpha Electro Information Pack", Pipisrel, Revision 05, Oct. 2017, pp. 1-23.

"Strings, Parallel Cells, and Parallel Strings", OrionBMS, Available Online at: https://www.orionbms.com/manuals/pdf/parallel_strings.pdf, pp. 1-17.

"This Week@ NASA", NASA TV, Jun. 17, 2016, 2 pages.

"U-Changer XP Rev 2 User Manual", Valence—Advanced Energy Systems, Document Version 4.8, Nov. 2011, 61 pages.

"Vahana, the Self-Piloted, eVTOL Aircraft from A3 by Airbus, Successfully Completes First FullScale Test Flight", Airbus, Feb. 2, 2018, 3 pages.

"WattsUP, the New 2-Seat Electric Trainer", Pipistrel Aircraft—News, Available Online at: http://www.pipistrel.si/news/wattsup-the-new-2seat-electric-trainer-took, 2 pages.

"XTI Aircraft Tri Fan 600", Electric VTOL News, 11 pages.

"XTI TriFan 665 Flies!", The Electric VTOL News, May 8, 2019, 8 pages.

U.S. Appl. No. 15/885,303 , "Non-Final Office Action", Apr. 19, 2018, 5 pages.

U.S. Appl. No. 15/885,303 , "Notice of Allowance", Jul. 27, 2018, 5 pages.

U.S. Appl. No. 16/135,851 , "Non-Final Office Action", Nov. 28, 2018, 5 pages.

U.S. Appl. No. 16/135,851 , "Notice of Allowance", Feb. 19, 2019, 5 pages.

U.S. Appl. No. 16/405,218 , "Non-Final Office Action", Oct. 17, 2019, 7 pages.

U.S. Appl. No. 16/405,218 , "Notice of Allowance", Jan. 23, 2020, 5 pages.

U.S. Appl. No. 16/856,605 , "Non-Final Office Action", Jun. 25, 2020, 5 pages.

U.S. Appl. No. 16/856,605 , "Notice of Allowance", Aug. 19, 2020, 6 pages.

Andrea , "Battery Management Systems for Large Lithium-Ion Battery Packs", Artech House, 2010, 303 pages.

Bertorelli , "Airbus Announces Electric Aircraft", Avweb, Apr. 26, 2014, 1 page.

Bodson et al., "Control Allocation with Load Balancing", American Institute of Aeronautics and Astronautics, Aug. 10-13, 2009, pp. 1-13.

Bordignon , "Constrained Control Allocation for Systems with Redundant Control Effectors", Virginia Polytechnic Institute and State University ProQuest Dissertations Publishing, Dec. 19, 1996, 260 pages.

Chin et al., "Battery Evaluation Profiles for X-57 and Future Urban Electric Aircraft", American Institute of Aeronautics and Astronautics/Institute of Electrical and Electronics Engineers Electric Aircraft Technologies Symposium, Aug. 26-28, 2020, pp. 1-12.

Chin et al., "Battery Performance Modeling on Maxwell X-57", American Institute of Aeronautics and Astronautics, 2019, pp. 1-15.

Clarke et al., "X-57 Power and Command System Design", Institute of Electrical and Electronics Engineers Transportation Electrification Conference and Expo, Jun. 22-24, 2017, 8 pages.

Cobb , "Four-Seat Sun Flyer in the Works", The Aircraft Owners and Pilots Association, Jul. 23, 2017, 3 pages.

Grady , "Pipistrel Introduces Alpha Electro", Apr. 14, 2015, 1 page.

Harkegard , "Efficient Active Set Algorithms for Solving Constrained Least Squares Problems in Aircraft Control Allocation", Proceedings of the 41st Institute of Electrical and Electronics Engineers Conference on Decision and Control, May 6, 2002, 25 pages.

Huber , "Electric Sun Flyer Plans Fall First Flight", Available Online at: https://www.ainonline.com/aviation-news/general-aviation/2017-07-26/electric-sun-flyer-plans-fall-first-flight, Jul. 26, 2017, 2 pages.

Johansen et al., "Control Allocation—A Survey", Nov. 2, 2012, 22 pages.

Merheb et al., "Active Fault Tolerant Control of Octorotor UAV Using Dynamic Control Allocation", The 2014 International Conference on Intelligent Unmanned Systems, Sep. 2014, 6 pages.

Moore , "The Joby S2 VTOL Concept : Exploring the New Degrees of Design Freedom of Distrusted Electric Propulsion", Vertifile, Nov.-Dec. 2014, pp. 22-24.

Niles , "Pipistrel Flies WATTsUP Electric Trainer", AVweb, Aug. 24, 2014, 1 page.

Rapoport , "Airbus Pivots Electric Aircraft Plans", Archer-NDCA-00171664, Apr. 1, 2017, 1 page.

Stoll et al., "Conceptual Design of the Joby S2 Electric VTOL PAV", Aviation Technology, Integration, and Operations Conference, Jun. 16-20, 2014, pp. 1-6.

Szondy , "E-Fan Electric Aircraft makes First Public Flight", Archer-NDCA-00171660, Apr. 30, 2014, 4 pages.

Yoney , "Pipistrel Taurus Electro G2 takes to the Skies, Goes on Sale", Archer-NDCA-00171840, Feb. 25, 2011, 5 pages.

Zhou et al., "Reconfigurable Control Allocation Technology Using Weighted Least Squares for Nonlinear System in Unmanned Aerial Vehicle", Session: IS-4: Intelligent Adaptation and Model Identification, Jun. 25, 2012, pp. 1-11.

* cited by examiner

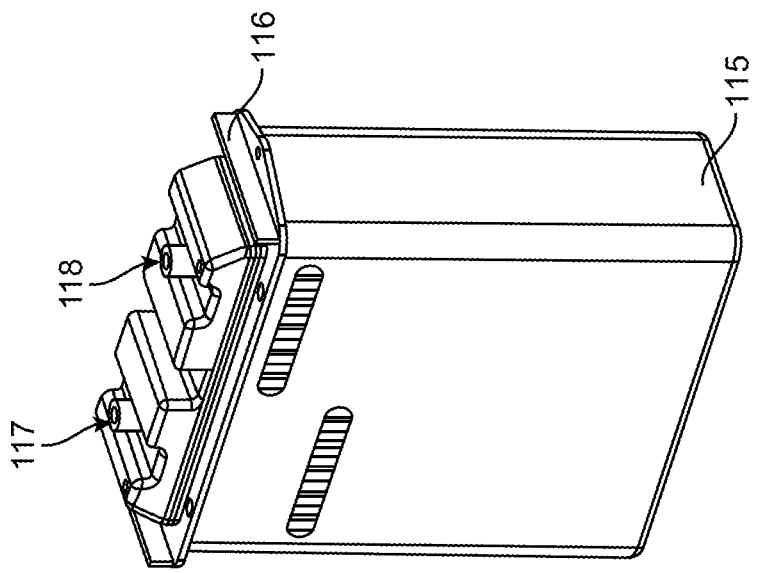
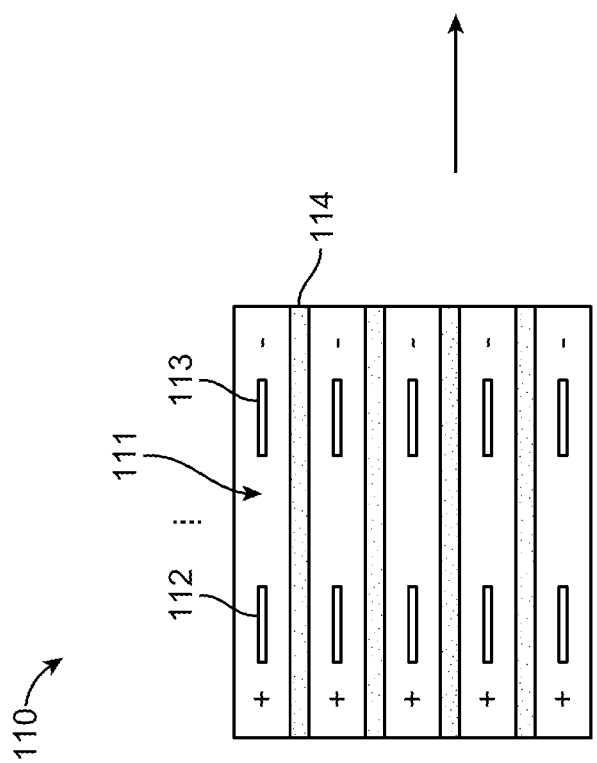
FIG. 2A
FIG. 2B

| | $T_1$ 470 | $SOC_1$ 472 | $V_{cell,max,1}$ 474 | $V_{cell,min,1}$ 486 |
|---|---|---|---|---|
| Battery Sub-Module 1 476 | | | | |
| ... | ... | ... | ... | ... |
| Battery Sub-Module N 478 | $T_N$ | $SOC_N$ | $V_{cell,max,N}$ | $V_{cell,min,N}$ |

FIG. 4

MULTI-BATTERY CHARGING STATION WHICH PROVIDES BATTERY-SPECIFIC CHARGING PARAMETERS

RELATED APPLICATIONS

This application claims benefit under 35 USC§ 119(e) to U.S. Provisional Patent Application No. 63/236,027 filed Aug. 23, 2021 and entitled "Multi-Battery Charging Station Which Provides Battery-Specific Charging Parameters," the disclosure of which is incorporated by reference herein in their entirety for all purposes.

BACKGROUND

New types of electric vehicles are being developed which rely solely upon battery power. Some vehicles may include multiple batteries for redundancy and increased energy capacity. However, introducing multiple batteries into a single system can create complications with maintaining health of each battery as well as the overall system, and maintaining similar charge across the batteries.

Embodiments of the present invention address these problems and other problems, individually and collectively.

SUMMARY

Described herein are examples (or embodiments) of a battery charging system. The battery charging system can use a single power source to simultaneously provide electric power to multiple batteries. Further, the power from the single power source can be distributed in a controlled and unequal manner. As a result, each of the batteries can receive a recharging electric current that has a custom set of charging parameters. Each set of custom charging parameters can be designed for a specific battery. The custom charging parameters can be determined based on battery metrics gathered for that battery, and can be designed to optimize for a number of suitable priorities, such as recharging speed and battery health. As a result, the battery charging system allows each battery to be recharged according to individual needs, and thereby maintain a healthy system of multiple batteries.

Embodiments provide a system comprising an aircraft including one or more propulsion systems and a plurality of battery submodules. Each of the plurality of battery submodules is electrically coupled to one or more of the one or more propulsion systems. The system also includes a charger configured to provide electric power the plurality of battery submodules, and a charger interface coupled to the aircraft and the charger. The charger interface includes a processor and a memory coupled with the processor. The memory is configured to provide the processor with instructions which when executed cause the processor to determine a total charging power based on a plurality of sets of one or more custom charging parameters, where each set of one or more custom charging parameters corresponds to a respective battery submodule of the plurality of battery submodules, operate the charger to provide the total charging power to a plurality of power converters, and operate the plurality of power converters to distribute the total charging power to one or more of the plurality of battery submodules according to the plurality of sets of one or more custom charging parameters.

According to further embodiments, the total charging power is distributed to the plurality of battery submodules unequally.

According to further embodiments, each of the plurality of sets of one or more custom charging parameters include a custom current amount for a corresponding battery submodule of the plurality of battery submodules.

According to further embodiments, the custom current amount is a function of time.

According to further embodiments, the plurality of power converters are DC-to-DC converters, and operating the plurality of power converters to distribute the total charging power to one or more of the plurality of battery submodules includes individually operating each of the plurality of power converters to modify an input electric current received from the charger into an output electric current according to the custom current amount for the corresponding battery submodule.

According to further embodiments, the system also includes an adaptor coupled to the aircraft and the charger. The adaptor includes the charger interface and the plurality of power converters.

According to further embodiments, the aircraft further comprises one or more of battery monitoring systems, each of which is configured to collect one or more battery metrics for a respective battery submodule of the plurality of battery submodules. The instructions further cause the processor of the charger interface to receive, from each of the one or more battery monitoring systems, the one or more battery metrics for the respective battery submodule of the one or more battery submodules; and determine, for each of the plurality of battery submodules, the set of one or more custom charging parameters for the battery submodule based on the one or more battery metrics for the battery submodule.

According to further embodiments, determining, for each of the plurality of battery submodules, the set of one or more custom charging parameters for the battery submodule includes optimizing a recharging process for the battery submodule.

According to further embodiments, optimizing the recharging process includes determining a balance between minimizing recharging speed and minimizing battery degradation.

According to further embodiments, the system includes a plurality of control connection lines between each of the one or more battery monitoring systems and the charger interface, between each of the power converters and the charger interface, and between the charger and the charger interface. The system also includes a plurality of power connection lines between each of the plurality of power converters and their respective battery submodules, and between the charger and each of the plurality of power converters.

According to further embodiments, the instructions further cause the processor of the charger interface to receive, from each of the one or more battery monitoring systems, one or more updated battery metrics for the respective battery submodule of the plurality of battery submodules; determine, for each of the plurality of battery submodules, an updated set of one or more custom charging parameters for the battery submodule based on the one or more updated battery metrics for the battery submodule; determine an updated total charging power based on the updated sets of one or more custom charging parameters; operate the charger to provide the updated total charging power; and operate the plurality of power converters to distribute the updated total charging power to the plurality of battery submodules according to the updated sets of one or more custom charging parameters.

Embodiments also provide a charger interface comprising a processor and a memory coupled with the processor. The memory is configured to provide the processor with instructions which when executed cause the processor to determine a total charging power based on a plurality of sets of one or more custom charging parameters, where each set of one or more custom charging parameters corresponds to a respective battery submodule of a plurality of battery submodules included in an aircraft; operate a charger to provide the total charging power to a plurality of power converters; and operate the plurality of power converters to distribute the total charging power to one or more of the plurality of battery submodules according to the plurality of sets of one or more custom charging parameters.

Embodiments also provide a method comprising determining, by a charger interface, a total charging power based on a plurality of sets of one or more custom charging parameters, where each set of one or more custom charging parameters corresponds to a respective battery submodule of a plurality of battery submodules included in an aircraft; operating, by the charger interface, a charger to provide the total charging power to a plurality of power converters; and operating, by the charger interface, the plurality of power converters to distribute the total charging power to one or more of the plurality of battery submodules according to the plurality of sets of one or more custom charging parameters.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings.

FIGS. 2A-2B depict an example of a battery submodule, according to various embodiments.

FIG. 4 depicts an example of a table of collected battery metrics, according to various embodiments.

DETAILED DESCRIPTION

Techniques disclosed herein relate generally to a charging system for a battery-powered vehicle, such as an aircraft (e.g., an electric vertical take-off and landing (eVTOL) aircraft) or car. The vehicle can include multiple battery submodules. Each battery submodule can be individually monitored to determine an optimal set of custom charging parameters for recharging that battery submodule. A charging system can then be controlled to provide individual electric currents with different custom charging parameters to each of the battery submodules. A single charger or power source can provide a total amount of electric power. Battery-specific power converters at separate branched power lines can modify the electric power for their respective battery submodules according to the custom charging parameters. Various inventive embodiments are described herein, including methods, processes, systems, devices, and the like.

Additional details regarding electric vehicle and charging systems can be found in U.S. Pat. No. 10,110,033 entitled "MULTI-BATTERY Charging Station Which Selectively Connects Battery Sub-Modules To A Common Power Bus For Charging" and granted on Oct. 23, 2018, which is incorporated by reference herein.

Figure 1:
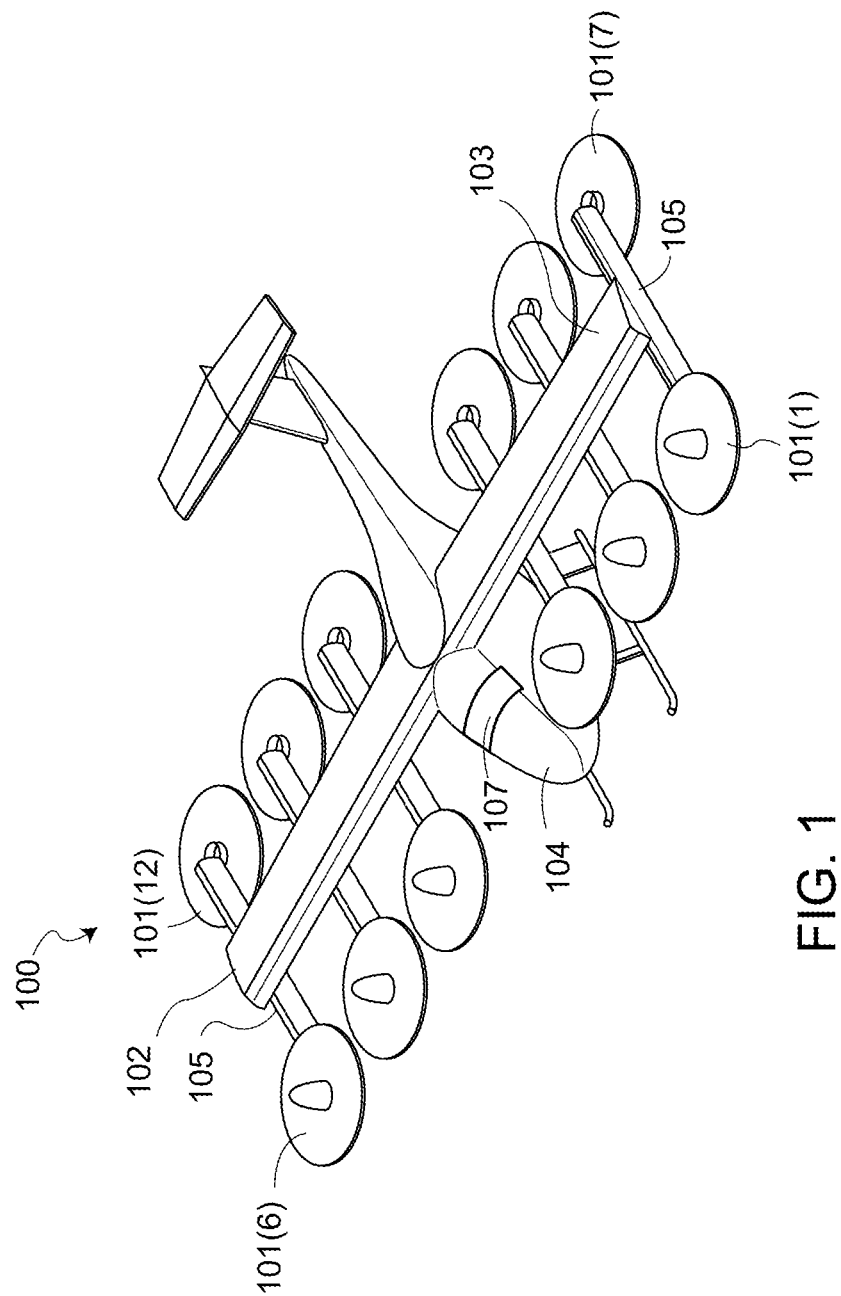
FIG. 1 depicts an exemplary aircraft, according to various embodiments.

FIG. 1 depicts an example aircraft 100, according to embodiments. The aircraft 100 can be any suitable type of flying vehicle, such as an airplane, a helicopter, or a hybrid-type flying vehicle. The aircraft 100 can be configured for human piloting, remote piloting, and/or automated flight. In the example shown, aircraft 100 includes a fuselage 104 that may include a cabin section for carrying passengers and/or cargo. Any suitable number of wings, such as the first wing 102 and second wing 103 can be attached to the fuselage 104.

In some embodiments, the aircraft 100 may be capable of vertical take-off and landing (VTOL). The aircraft 100 can include any suitable number of propulsion systems. Twelve electronic propulsion systems 101(1)-101(12) are shown in FIG. 1. The twelve electronic propulsion systems 101(1)-101(12) are shown in a vertical flight configuration, though at least a subset of them may also be configured to tilt into a horizontal flight configuration, according to some embodiments. The propulsion systems 101(1)-101(12) may be mounted on opposite ends of booms 105. One or more booms 115 may be coupled to each wing 102, 103 of the aircraft 100 to enable aircraft 100 to have any number of propulsion systems 101(1)-101(12). For example, each wing 102, 103 may include three booms 105, with each boom including a pair of electronic propulsion systems 101(1)-101(12) mounted thereon. The number of booms and/or electronic propulsion systems may vary according to the flight needs and requirements of the aircraft 100.

According to various embodiments, the aircraft 100 may include a control system 107, such as a flight control system, that is configured to control the aircraft 100. The control system 107 may be configurable to control the aircraft 100 automatically and/or remotely (e.g., via a control signal received from a remote entity, such as a remote controller, a remote pilot or a remote control tower). In various embodiments, the control system 107 can include one or more computers with one or more non-transitory computer readable medium storing instructions, and one or more processors configured to execute the instructions in order to perform the processing and control functions described herein.

The control system 107 may control when the propulsion systems 101(1)-101(12) should be operated, and/or the amount of power provided to the propulsion systems 101(1)-101(12). The control system 107 may be configurable to control the propulsion systems 101(1)-101(12) independently from one another. According to various embodiments, the control system 107 may control the propulsion systems 101(1)-101(12) based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

According to various embodiments, the aircraft 100 may be an electrically-powered aircraft or a hybrid-electric aircraft. One or more battery submodules may be included in the aircraft 100 (e.g., within the fuselage 104) to provide power to various aircraft components, such as one or more electric motors and/or on-board computer systems. The propulsion systems 101(1)-101(12) may be driven by electric motors that are powered by a power system including the one or more battery submodules. In some embodiments, each of the propulsion systems 101 may be coupled to a dedicated battery submodule. In some cases, one or more battery submodules may be the sole power source for the aircraft 100 resulting in a one-to-many relationship between the one or more battery submodules and the propulsion systems.

A battery is an electrochemical device that can convert stored chemical energy to electrical energy. Examples of battery technologies include lithium-ion batteries, nickel-metal-hydride batteries, lead-acid batteries, nickel-cadmium batteries, alkaline batteries, and so on. Batteries can be made in many sizes and with a range of operating characteristics (e.g., voltage (or electrical potential), maximum current, charge capacity, and so on). To support high voltage or high charge capacity, multiple battery cells can be electrically connected in series and/or in parallel, and the battery cells can be packaged together into a battery submodule.

An example of a battery submodule 110 with one or more battery cells is illustrated in FIGS. 2A-2B. FIG. 2A depicts a top view of stacked (e.g., layered) contents of an exemplary battery submodule 110. FIG. 2B illustrates a perspective-view of an assembled battery submodule 110.

According to various embodiments, the contents of the battery submodule 110 can include a battery stack of one or more battery cells 111. The contents can further include one or more separation layers 114, which may include thermally-insulating materials (e.g., for heat containment), thermally-conducting materials (e.g., for heat dispersion), heat-absorbing materials, and/or any other suitable components. A container 115 (e.g., a metal can) can surround and/or compresses the stacked contents of the battery submodule 110.

Each battery cell 111 of the battery submodule 110 may include a first tab 112 with a first polarity (e.g. positive tab) and a second tab 113 with a second polarity opposite to the first polarity (e.g. negative tab). Each first tab 112 can be interconnected electrically and each second tab 113 can be interconnected electrically. As a result, when the contents of the container 115 are sealed with a lid 116 (as shown in FIG. 2B), the lid 116 may expose a single positive connection 117 or port and a single negative connection 118 or port.

A battery submodule 110 can be implemented as a single battery cell 111 or as a battery pack that includes multiple battery cells 111 connected together in series and/or in parallel as desired. As used herein, the term "battery cell" or "cell" can be understood as including a standalone battery or, in the case of a battery submodule 110, one of some number of independently replaceable battery units within the battery submodule 110.

As mentioned above with respect to FIG. 1, one or more battery submodules 110 may be used to power an aircraft 100. Embodiments described herein can also apply to other electric vehicles, such as a watercraft, rail vehicle, car, truck, off-road vehicle, personal transporter (e.g., skateboard or scooter), electric bicycle, or the like. In the case of an all-electric aircraft, redundancy may be especially desired for the electric power system. Accordingly, in some embodiments, the battery system includes multiple battery submodules 110. Multiple battery submodules 110 may be connected in parallel to a shared or common power bus which supplies power to the electronics (e.g., at a relatively low voltage, such as on the order of 5V) and propulsion systems 101(1)-101(12) (e.g., at a relatively high voltage, such as on the order of 700V). One or more diodes or switches can be included that are configured to electrically disconnect a failing battery submodule 110 from the common power bus in order to keep the aircraft 100 airborne and/or prevent further damage to the power system. In other embodiments, as discussed in more detail below, battery submodules 110 may not share a common power bus, and may be electrically isolated from one another. For example, each battery submodule may be paired with a respective propulsion system 101(1)-101(12).

Battery submodules 110 can be rechargeable by connecting to a power source, such as a charger (e.g., a source of charging current). In some situations, multiple battery submodules 110(A)-(N) may be connected to a common bus and ground. As a result of being connected to a common bus (e.g., a wire connecting to the batteries and charger without interceding components), any charging current/voltage applied by a charger will distribute itself among the multiple battery submodules 110 in an uncontrolled manner. However, this setup may not be ideal, as each of the multiple battery submodules 110 may prefer different charging parameters. For example, different battery submodules 110 may be in different states (e.g., having different charge levels, temperatures, number of battery cells, etc.), and optimal charging parameters (e.g., amount of current, amount of voltage, amount of total power, time duration, etc.) may vary based on current states of battery submodules 110. Optimal (or improved) charging parameters can be configured to minimize total recharge time, minimize battery degradation, or meet any other suitable consideration. If charging current applied by a charger is allowed to distribute itself among the multiple battery submodules 110 in an uncontrolled manner, then optimal charging parameters can only be provided for at most one battery submodule 110, while the remaining battery submodules 110 will receive a charging current with less-than-optimal charging parameters. Accordingly, it is desirable to control the charging parameters on an individual basis for each of the battery submodules 110.

Figure 3:
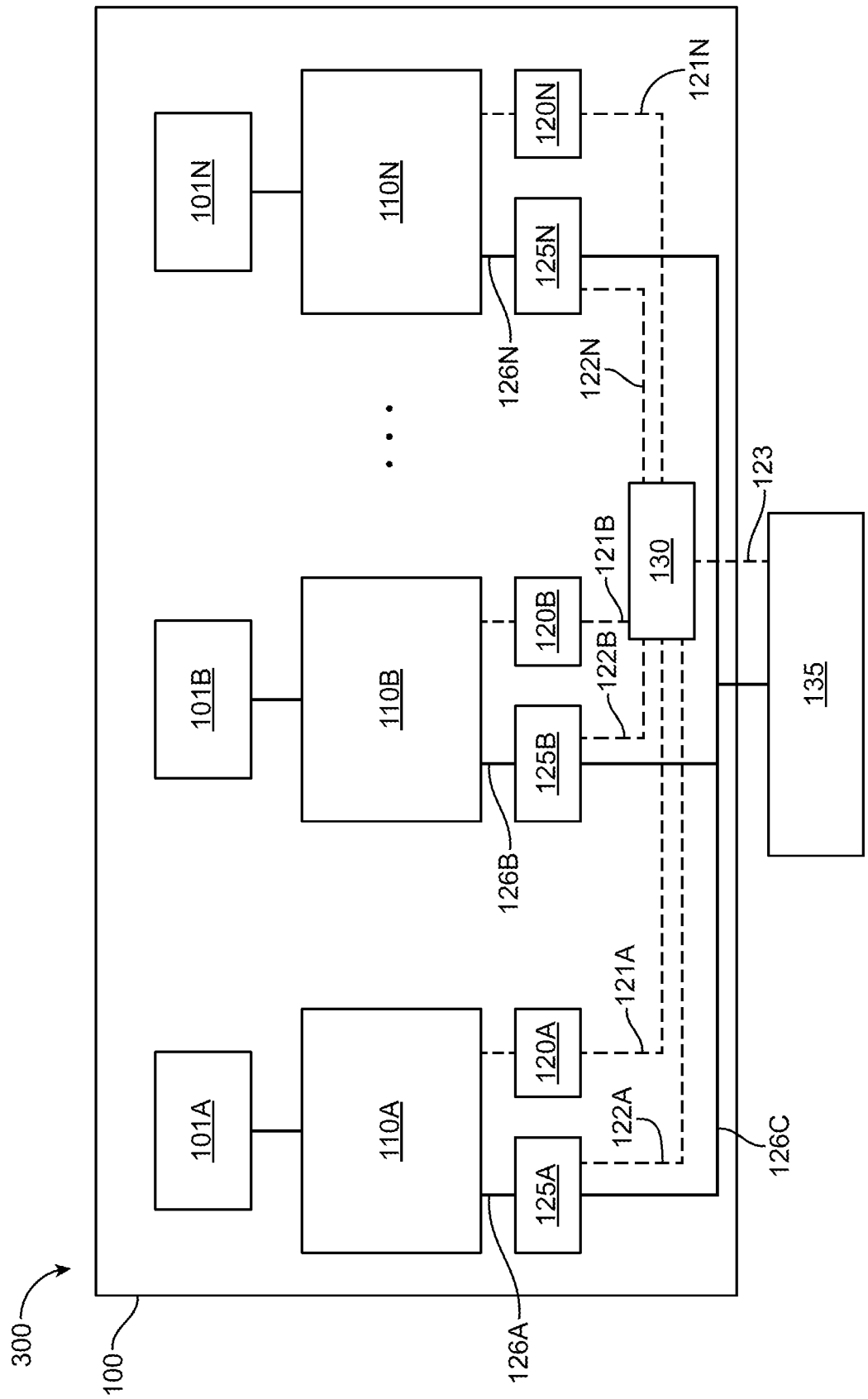
FIG. 3 illustrates a system for simultaneously providing electric power with multiple sets of custom battery-specific charging parameters to different batteries of a set of multiple batteries, according to various embodiments.

FIG. 3 illustrates a system 300 for simultaneously providing electric power with different sets of custom battery-specific charging parameters to different batteries from a set of multiple batteries, according to some embodiments. The system 300 includes an aircraft 100 (represented by a box) with electronic components such as a set of battery submodules 110(A)-(N), a set of battery monitoring systems 120(A)-(N), a set of power converters 125(A)-(N), and a charger interface 130. Additionally, the system 300 includes off-aircraft components such as a charger 135.

The charger 135 may be located on the ground at a charging station (e.g., within an airport, a heliport, parking area, etc.). The charger 135 may include a power source. The charger 135 may be configured to provide electric power to the aircraft 100 in order to recharge the battery submodules 110(A)-(N). The charger 135 can be removably coupled to the aircraft 100. For example, when the aircraft 100 is located at the charging station, the charger 135 can be physically and electrically connected to one or more electronic components of the aircraft 100.

The aircraft 100 can include any suitable number of propulsion systems 101(A)-(N). As shown in FIG. 3, in some embodiments, each of the propulsion systems 101(A)-(N) can be electrically connected to and powered by a dedicated battery submodule from the set of battery submodules 110(A)-(N). For example, a first battery submodule 110(A) can be electrically coupled to and provide power to a first propulsion system 101(A), a second battery submodule 110(B) can be electrically coupled to and provide power to a second propulsion system 101(B), and a third (or Nth) battery submodule 110(N) can be electrically coupled to and provide power to a third (or Nth) propulsion system 101(N).

In other embodiments, one or more propulsion systems 101(A)-(N) can be coupled to and electrically powered by two or more of the battery submodules 110(A)-(N). For example, the first battery submodule 110(A) may be electrically coupled to and provide power to both the first propulsion system 101(A) and the second propulsion system 101(B), and the second battery submodule 110(B) may also be electrically coupled to and provide power to both the first propulsion system 101(A) and the second propulsion system 101(B). This way, the first propulsion system 101(A) and the second propulsion system 101(B) can both have multiple redundant power sources. Any other suitable coupling combinations between battery submodules 110(A)-(N) and propulsion systems 101(A)-(N) can be utilized. One or more of the battery submodules 110(A)-(N) may further provide power to control systems and/or other electric components.

As shown in FIG. 3, a set of battery monitoring systems (BMS) 120(A)-(N) can be electrically coupled to the battery submodules 110(A)-(N). In some embodiments, each of the battery submodules 110(A)-(N) can have a dedicated respective BMS from the set of BMS 120(A)-(N).

Each BMS 120(A)-(N) can be configured collect metrics for a corresponding battery submodule 110(A)-(N). According to embodiments, a BMS 120(A)-(N) may include, or be in communication with, one or more measurement instruments. Examples of measurement instruments include a thermometer, a charge meter, a voltage meter, a current meter, etc. Each BMS 120(A)-(N) can also include one or more computers with one or more non-transitory computer readable medium storing instructions, and one or more processors configured to execute the instructions in order to perform the battery monitoring functions and communications described herein.

A BMS 120(A)-(N) can be configured measure, estimate, receive, and/or collect any suitable information related to the state or condition of a corresponding battery submodule 110(A)-(N). Examples of metrics that a BMS 120(A)-(N) can collect include metrics associated with battery health (e.g., instantaneous internal resistance, charge capacity, temperature, etc.), metrics associated with a battery's state of charge (e.g., a percentage associated with the degree to which the battery is charged, given that battery's storage capacity), derivative of voltage with respect to time given a known current, etc.

According to embodiments, a BMS 120(A)-(N) can be configured to continuously or periodically measure and/or collect updated metrics. Further each BMS 120(A)-(N) can provide the collected metrics to a central computer, such as the charger interface 130, continuously or periodically.

In some embodiments, one BMS may collect information from more than one of the battery submodules 110(A)-(N). As a result, the system 300 may include less battery monitoring systems than battery submodules 110(A)-(N). Instead of a one-to-one relationship between battery submodules 110(A)-(N) and battery monitoring systems, there may be a many-to-one between battery submodules 110(A)-(N) and battery monitoring systems. In one example, the system 300 may include a single BMS (e.g., the BMS 120(A)), and that BMS may be in communication with and/or configured to collect metrics each of the battery submodules 110(A)-(N).

A charger interface 130 can be configured to perform various charging-related processing and tasks. For example, the charger interface may be configured to receive and aggregate metrics from one or more BMS 120(A)-(N), determine custom charging parameters for one or more battery submodules 110(A)-(N), and control and/or communicate with other components so that the one or more battery submodules 110(A)-(N) can be charged according to the custom charging parameters. The charger interface 130 can include one or more computers with one or more non-transitory computer readable medium storing instructions, and one or more processors configured to execute the instructions in order to perform the charger interface functions and communications described herein.

In some embodiments, some or all of the charger interface 130 functionality may instead be performed by a control system 107, such as a flight control unit. In this case, the box labeled 130 in FIG. 3 may instead represent a control system 107 (e.g., a flight control unit). However, as discussed herein, some or all of the charging-related processing, control and/or decision making may be performed by a dedicated charger interface 130, thereby offloading these functions from the control system 107 (e.g., a flight control unit) to ease processing burdens for the control system 107.

According to embodiments, the charger interface 130 can be configured to receive and aggregate metrics from one or more BMS 120(A)-(N). For example, the charger interface 130 may receive, from each of the first BMS 120(A), the second BMS 120(B), and the third (or Nth) BMS 120(N), collected metrics for their corresponding battery submodules (e.g., the first battery submodule 110(A), the second battery submodule 110(B), and the third (or Nth) battery submodule 110(N) respectively). The charger interface 130 may aggregate and store the metrics for each BMS 120(A)-(N), and the stored metrics may be continuously or periodically updated with more recent measurements.

FIG. 4 depicts an example of a table of collected battery metrics stored by the charger interface 130. Each row in the table contains metrics for a particular battery submodule. For example, row 476 represents metrics for the first battery submodule 110(A), and row 478 represents metrics for the third (or Nth) battery submodule 110(N). Each column represents a specific type of metric. For example, column 470 includes a temperature ($T_i$) data, column 472 includes state of charge ($SOC_i$) data (e.g., a percentage), column 474 includes maximum cell voltage ($V_{cell,max,i}$) data, and column 486 includes minimum cell voltage ($V_{cell,min,i}$) data. Each of these metrics may be dynamic values, and may be updated continuously and/or periodically to reflect current values. One of ordinary skill will appreciate that these metrics are provided for illustrative purposes, and the collected battery metrics may include less or more metrics than those illustrated in FIG. 4.

The maximum cell voltages ($V_{cell,max,i}$) of column 474 relate to voltages at the cell level for each of the respective battery submodules 110(A)-(N). Different battery cells within the same battery submodule may have different voltages. The maximum cell voltage ($V_{cell,max,i}$) for a given battery submodule is the (e.g., measured) voltage of the cell with the highest voltage in that battery submodule. For example, $V_{cell,max,1}$ is the maximum cell voltage in the first battery submodule (see row 476), and $V_{cell,max,N}$ is the maximum cell voltage in the Nth battery sub-module (see row 478).

The minimum cell voltages ($V_{cell,MIN,i}$) of column 486 relate to voltages at the cell level for each of the respective battery submodules 110(A)-(N). These voltages are at the cell level and represent the minimum voltage of a cell within a particular battery submodule.

Referring back to FIG. 3, according to embodiments, the charger interface 130 can further be configured to determine custom charging parameters for one or more battery submodules 110(A)-(N) based on one or more metrics for each respective battery submodule 110(A)-(N). For example, the charger interface 130 may determine custom charging parameters for the first battery submodule 110(A) based on battery metrics received from the first BMS 120(A), determine custom charging parameters for the second battery submodule 110(B) based on battery metrics received from the second BMS 120(B), and determine custom charging parameters for the third (or Nth) battery submodule 110(N) based on battery metrics received from the third (or Nth) BMS 120(N). In some embodiments, custom charging parameters for a given battery submodule may be based on battery metrics from more than one battery submodule (e.g., to analyze relative metrics).

To determine the custom charging parameters for a given battery submodule, the charger interface 130 may analyze the metrics to determine what charging parameters may be optimal or preferred for that battery submodule. The custom charging parameters may be configured to match or otherwise be based on the determined optimal or preferred charging parameters.

As mentioned above, different battery submodules 110(A)-(N) may be in different states at any given time, so different metrics may be associated with different battery submodules 110(A)-(N). As a result, different charging parameters may be considered optimal or preferred for different battery submodules 110(A)-(N). According to embodiments, the system 300 is capable of providing different charging currents with parameters to different battery submodules 110(A)-(N) at the same time. Thus, multiple different charging parameter preferences can be satisfied simultaneously. For example, the charger interface 130 can establish or instruct a unique set of custom charging parameters for each of the battery submodules 110(A)-(N), where each set of custom charging parameters matches (or is based on) the determined optimal or preferred charging parameters for that battery submodule.

As examples, charging parameters can include an amount of input current, an amount of input voltage, an amount of power, charging time, charging pulse frequency, derivative of current and/or voltage over time, and/or any other suitable characteristic of a battery charging process. Charing parameters can be static values or dynamic values, and may be expressed as a function of time. Accordingly, custom charging parameters can include a custom current amount, a custom power amount, a custom voltage amount, a custom charging time, and may be expressed as static values or as functions of time, etc.

Charging parameters can be considered optimal or preferred based on one or more general considerations or priorities. For example, in some embodiments, optimal parameters may be charging parameters that maximize charging speed and/or provide the fastest recharge (e.g., lowest amount of time before reaching full or sufficient recharge). In this case, higher current, voltage, and/or power may generally be considered more optimal. For example, it may be desired to fully or sufficiently charge a battery submodule as fast as possible, or within a certain predefined timeframe (e.g., 5 minutes, 10 minutes, 15 minutes, 30 minutes, 45 minutes, or 1 hour). "Fast charging" is defined as a charging rate that fully or sufficiently (e.g., up to 90%) charges the battery in an hour or less. The term "1C" refers to a charging rate that fully charges a battery in an hour, "2C" refers to a charging rate that fully charges a battery in ½ hour or 30 minutes, "3C" refers to a charging rate that fully charges a battery in ⅓ hour or 20 minutes, and "4C" refers to a charging rate that fully charges a battery in ¼ hour or about 15 minutes. It may be desired to charge a battery submodule at 1C, 2C, 3C, 4C, or any other suitable rate.

As another example, optimal parameters may be charging parameters that minimize battery degradation or otherwise best maintain battery health and promote battery longevity. Typically, the faster a battery is charged, the more the battery is degraded and longevity reduced. The degradation is primarily due to the amount of current delivered (e.g., more current corresponds to faster degradation). In this case, lower current, voltage, and/or power may generally be considered more optimal.

In some embodiments, optimal parameters may be charging parameters that are determined to strike a balance between minimizing charging time and minimizing battery degradation, as those concerns may sometimes be in conflict (e.g., slower charging may reduce battery degradation, while faster charging may increase battery degradation). In this case, moderate current, voltage, and/or power may generally be considered more optimal, and certain patterns of modulating the amount of current, voltage, and/or power may be considered more optimal. The best balance may be determined based on the cost for replacing or repairing batteries, as well as what charge times are considered acceptable.

Embodiments allow any other suitable battery-related concern to be prioritized and considered when determining what types of charging parameters are optimal. In some embodiments, the charging parameters may be determined based on user input (e.g. charging parameters may be customizable). Also, different considerations may have a higher priority for different battery submodules.

In addition to the more general considerations, the current metrics for a given battery submodules 110(A)-(N) can influence what charging parameters are considered optimal, as mentioned above. For example, a charge state metric may be considered when determining optimal parameters. In one example, if a charge state is low (e.g., less than 30% charged), it may take a relatively long time to recharge the battery. Accordingly, charge rate and time may be prioritized when determining optimal charging parameters.

The relative charge state of a given battery submodule when compared with other battery submodules may also be a factor. For example, if a battery submodule has a charge state that is relatively higher (e.g., 10% more) than the charge states of other battery submodules in the same system, then the battery submodule may be able to recharge within the same timeframe as the other battery submodules, even if a slower charging rate (e.g., lower current, voltage, or power) is used. Accordingly, optimal parameters may be those that prioritize battery health, as charging time may not be a concern for that given battery submodule. Additionally, charging parameters may be configured to limit charging time, or to switch to a from a constant current mode to constant voltage mode, in order to prevent overcharging a certain battery submodule.

Similarly, if a battery submodule has a charge state that is relatively lower (e.g., 15% less) than the charge states of other battery submodules in the same system, then it may require more time to charge than the other battery submodules. To avoid prolonging total charging time for the entire system, a higher charging rate (e.g., high current, voltage, or power) and lower charging time may be allocated for that specific battery submodule.

In some embodiments, one of the battery submodules may receive all of the total charging power for a some or all of the charging time. For example, if a first battery submodule has a charge state that is relatively lower (e.g., 50% less) than the charge states of other battery submodules in the same system, or if the other battery submodules in the same system are already sufficiently-charged (e.g., at the end of a recharging process), then the first battery submodule may receive all of the charging power from the charger 135 for some amount of time (e.g., a remainder of the charging process after other battery submodules are finished recharging). Also, one or more of the battery submodules may not receive any electric current or charging power for some or all of the charging time. For example, one or more battery submodules that are already sufficiently charged, or that have a relatively higher charge state (e.g., 30% more), may not receive any charging current for some or all of the recharging process (e.g., at the beginning, middle, or end of the recharging process).

As another example, battery health metrics may be considered when determining optimal parameters. In one example, if a given battery submodule tends to recharge more slowly than other battery submodules (e.g., due to low battery health), then it may require more time to charge than the other battery submodules. To avoid prolonging total charging time for the entire system, a higher charging rate (e.g., high current, voltage, or power) and lower charging time may be allocated for that specific battery submodule.

As another example, temperature may be considered when determining optimal parameters. Temperature can affect battery charging speeds, battery degradation rates, and can create safety limits for charging rates. For example, if a battery is too hot, it may not be considered safe to provide any charging power. In one example, if a given battery submodule has a high temperature (e.g., 50° C.) that is still within an acceptable temperature range (e.g., between 0° C. and 60° C.), a top priority may be ensuring that the battery submodule does not experience a further increase in temperature or otherwise stays within an acceptable temperature range. A slower charging rate may be best suited for recharging a battery without increasing temperature. Additionally, charging parameters can specify that the charging current should happen in bursts, with periodic breaks to allow cooling.

As another example, maximum cell voltage ($V_{cell,max,i}$) may be considered when determining optimal parameters. To prevent damage, it may be desirable to keep maximum cell voltage below a predefined voltage threshold. Accordingly, charging parameters can be configured to prevent exceeding the voltage threshold, and/or any other suitable predefined thresholds.

According to embodiments, the charger interface 130 can be further configured to determine a total charging power. The total charging power is determined based on the power desired for each of the battery submodules 110(A)-(N). For example, the charger interface 130 can calculate the sum of each individual determined power from the custom charging parameters of each of the battery submodules 110(A)-(N). The result is the minimum total charging power needed to provide the requested amount of power to each of the battery submodules 110(A)-(N) simultaneously.

As an example, it may be determined that a charging current of 10 amps is desired for the battery submodule 110(A), a charging current of 11 amps is desired for the battery submodule 110(B), and a charging current of 12 amps is desired for the battery submodule 110(N). In the case of a constant voltage that is the same for each of the battery submodules 110(A), 110(B), and 110(N), the charger interface 130 can determine that the total desired input current from the charger 135 is at least the sum of these currents, or 33 amps.

However, in some embodiments, there may not be constant voltage across different battery submodules. Accordingly, the charger interface 130 can instead determine a total power needed in order to provide the desired current amounts to the battery submodules. The total power is based on the sum of desired powers for each battery submodule, and the desired power for each battery submodule is determined based on the desired current for that battery submodule and the given voltage of that battery submodules (e.g., Power=Current×Voltage). For example, the desired 10 amps current may correspond to a desired power of 1 kW (e.g., based on a first voltage measured at the first battery submodule 110(A)), the desired 11 amps current may correspond to a desired power of 2 kW (e.g., based on a second voltage measured at the second battery submodule 110(B)), the desired 12 amps current may correspond to a desired power of 3 kW (e.g., based on a third voltage measured at the third battery submodule 110(N)), and the total minimum desired power may be the sum of these desired powers, or 6 kW.

According to embodiments, the charger interface 130 can be further configured to control and/or communicate with other components so that the one or more battery submodules 110(A)-(N) can be charged according to the custom charging parameters. For example, the charger interface 130 may be in communication with and/or control the charger 135. The charger interface 130 may control the charger 135 to provide electric current with the determined total charging power, or otherwise provide information about the determined total charging power to the charger 135. In some embodiments, charger interface 130 may request some amount of extra power in addition to the determined minimum total power to compensate for power conversion inefficiencies and any other losses during transmission.

Similarly, the charger interface 130 may be in communication with and/or control the power converters 125(A)-(N). The charger interface 130 may control the power converters 125(A)-(N) so that they manipulate the charging current from the charger 135 to have the determined custom charging parameters for their respective battery submodules 110(A)-(N), or to otherwise provide information about the determined custom charging parameters to the power converters 125(A)-(N). For example, the charger interface 130 can control or instruct the first power converter 125(A) to deliver charging current with a first determined current amount (e.g., 10 amps) to the first battery submodule 110(A), the charger interface 130 can control or instruct the second power converter 125(B) to deliver charging current with a second determined current amount (e.g., 11 amps) to the second battery submodule 110(B), and the charger interface 130 can control or instruct the third power converter 125(C) to deliver charging current with a third determined current amount (e.g., 12 amps) to the third battery submodule 110(N).

According to embodiments, the power converters 125(A)-(N) can be electronic circuits or electromechanical devices for converting electrical energy from one form to another. Each power converter 125(A)-(N) may be configurable to receive an input electric current with certain parameters (e.g., voltage, current, power, frequency) and provide an output electric current that is a modified to have a specified change in parameters (e.g., a different voltage, current, power, and/or frequency). An example of a power converter is a DC-to-DC converter that converts a source of direct current (DC) from one voltage level to another. Accordingly, the power converters 125(A)-(N) may be DC-to-DC converters. Embodiments allow power converters 125(A)-(N) to be any suitable device that is configured to modify electric power in any suitable manner. The system 300 is configured to utilize the power converters 125(A)-(N) to process and control the flow of electrical energy by supplying voltages and currents in a determined optimal form to each of the battery submodules 110(A)-(N). Instead of the electric current (also referred to as charging current or charging power) being allowed to passively distribute in an uncontrolled manner, the electric current can be manipulated by each the power converters 125(A)-(N) to have determined custom charging parameters before the electric current reaches each of the respective battery submodules 110(A)-(N). The power converters 125(A)-(N) can effectively divide up the total electric power provided by the charger 135 such that the electric power is distributed in a controlled manner.

The power converters 125(A)-(N) can be computer-controlled and adjustable to provide any specified output. For example, an external device, such as the charger interface 130, may control and/or instruct the one or more power converters 125(A)-(N) to convert power according to a specified set of one or more charging parameters, which may change over time. As a result, each power converter 125(A)-(N) may be controlled to provide electric power with custom charging parameters to a corresponding battery submodule from the group of battery submodule 110(A)-(N). Each power converter 125(A)-(N) can also include one or more computers with one or more non-transitory computer readable medium storing instructions, and one or more processors configured to execute the instructions in order to perform the power converting functions and communications described herein.

As shown in FIG. 3, a number of electrical and/or physical connection lines (e.g., wires), which may include removable couplings, can exist between various components. Control connection lines can exist for sending communications, control instructions, information, etc. For example, the charger interface 130 can be in communication with the first BMS 120(A), the second BMS 120(B), and the third (or more) BMS 120(N) through the control connection lines 121(A), 121(B), and 121(N), respectively. Further, the charger interface 130 can be in communication with the first power converter 125(A), the second power converter 125(B), and the third (or more) power converter 125(N) through the control connection lines 122(A), 122(B), and 122(N), respectively. An additional control connection line 123 can communicatively connect the charger interface 130 with the charger 135. The control connection line 123 can include a removable coupling, as the charger interface 130 will disconnect from the charger 135 when the aircraft 100 departs from the area.

In some embodiments, a separate set of electrical couplings and/or wires can be provided for power connections. For example, the charger 135 can transmit electric power to the first power converter 125(A), the second power converter 125(B), and the third (or more) power converter 125(N) through a power connection line 126(C), which may include branches (e.g., in parallel) to each of the power converters. Additional power connection lines can electrically connect each power converter to a respective battery submodule. For example, the first power converter 125(A) can transmit some of the received electric power (e.g., after modifying the power based on the custom charging parameters) to the first battery submodule 110(A) through the power connection line 126(A). Similarly, the second power converter 125(B) can transmit some of the received electric power to the second battery submodule 110(B) through the power connection line 126(B), and the third (or more) power converter 125(N) can transmit some of the received electric power to the third (or more) battery submodule 110(N) through the power connection line 126(N).

In embodiments, various settings of the system 100 can be dynamic. For example, the system 100 can continuously or periodically collect metrics, determine one or more new sets of custom charging parameters, and control the charger 135 and power converters 125(A)-(N) to modify the charging power as desired based on the new custom charging parameters. For example, a custom charging current may be controlled to increase or decrease over time based on how much a battery is charged, battery temperature (e.g., which may vary due to the charging process, inputs from heating units, and/or inputs from cooling units), battery phase change, and/or any other suitable metrics related to battery state or battery condition.

The charger 135 and/or power converters 125(A)-(N) can also be controlled to provide pulses of charging current, the frequency and duration of which can also be configured based on metrics. Further, the charger 135 and/or power converters 125(A)-(N) can be controlled to halt charging to one or more battery submodules 110(A)-(N) in the case of faults/errors or other relevant conditions that may be detected by a BMS 120(A)-(N).

In certain embodiments, certain calculations can be performed by different components. For example, instead of the charger interface 130 determining custom charging parameters for each of the battery submodules 110(A)-(N), these calculations may be performed at the charger 135, or each BMS 120(A)-N may be able to determine custom charging parameters for a corresponding battery submodule 110(A)-(N) as discussed in more detail below with respect to FIG. 6. Similarly, the power converters 125(A)-(N) can be controlled by any suitable component, such as a corresponding BMS 120(A)-(N) or the charger 135.

In some embodiments, a common electric bus for charging can be present between the battery submodules 110(A)-(N) and on the aircraft 110, but with switches that allow each of the battery submodules 110(A)-(N) to disconnect from the common electrical bus during operation and to connect only during charging operations on the ground.

Figure 5:
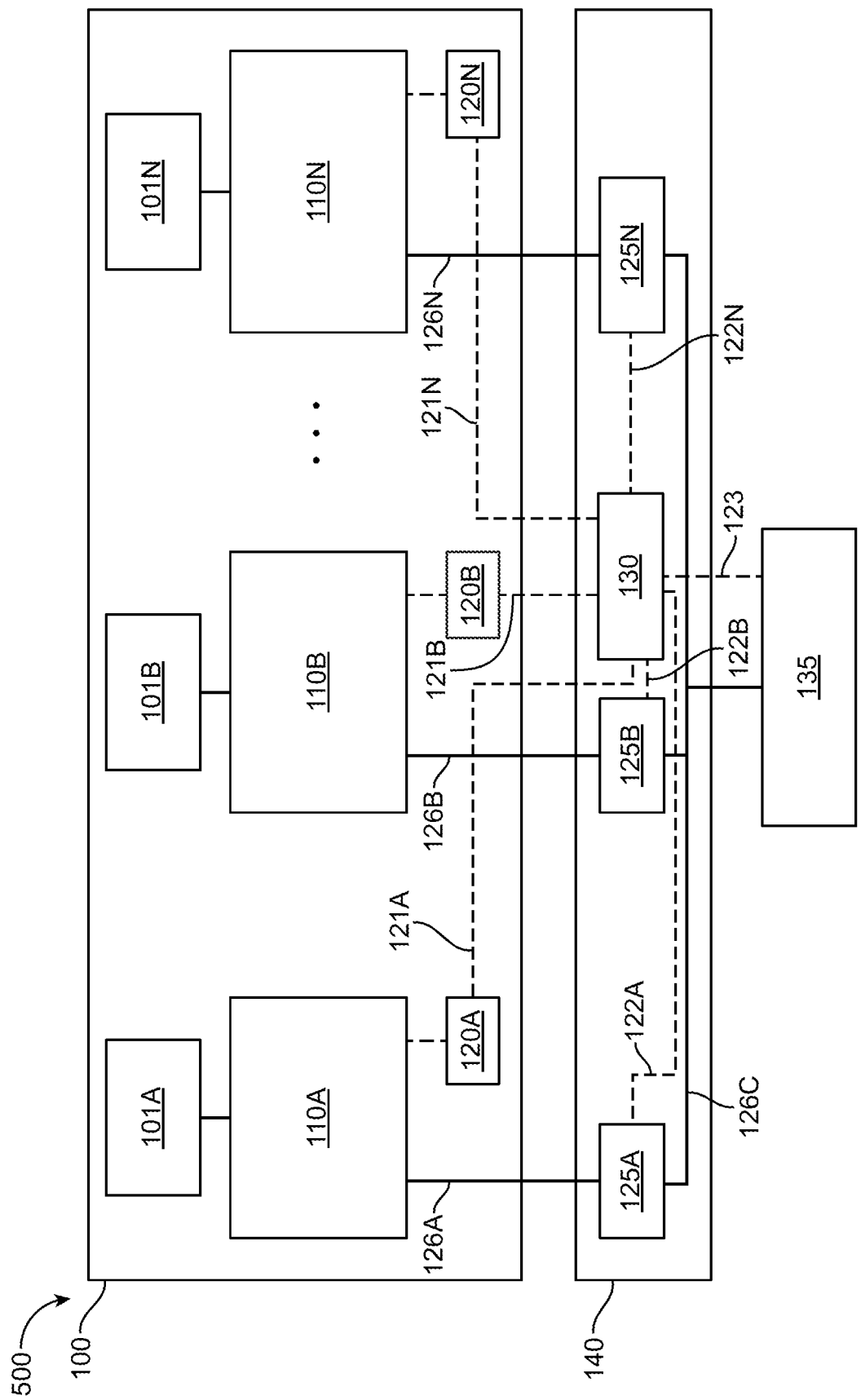
FIG. 5 illustrates a charging system with a charger interface and power converters being located at a charging station, according to various embodiments.

FIG. 5 illustrates another system 500 for simultaneously providing multiple custom battery-specific charging currents to different batteries from a set of multiple batteries, according to some embodiments. The system 500 in FIG. 5 is similar to the system 300 in FIG. 3, except that the charger interface 130 and/or the power converters 125(A)-(N) can be removed from the aircraft 100 and instead located at a charging station (e.g., at an airport on the ground).

In some embodiments, the power converters 125(A)-(N) and the charger interface 130 are combined together into a single housing (e.g., a dongle), which may be referred to as an adaptor 140. The adaptor 140 can be removably coupled to the charger 135. When the aircraft 110 is in a nearby position, the adaptor 140 can be removably coupled to the aircraft 110 (e.g., to the battery submodules 110(A)-(N) and/or the BMS 120(A)-(N)).

The same functionalities as discussed above with respect to FIG. 3 can still be provided by the system 500, as the components can all still be similarly coupled when the aircraft 100 is located on the ground. Additionally, the configuration of the system 500 can advantageously reduce complexity and weight on the aircraft 110 by moving components such as the charger interface 130 and/or the power converters 125(A)-(N) from the aircraft 110 to the ground equipment.

The adaptor 140 can include one or more electrical connection points and transmission lines. For example, the adaptor 140 can include at least one input power connection line 126(C) for receiving charging power from the charger 135. The adaptor 140 can include any suitable number of output power connection lines such as 126(A), 126(B), and 126(N) extending from each of the internal power converters 125(A)-(N), where the output power lines individually connect to separate battery submodules 110(A)-(N) on the aircraft 110. The adaptor 140 can further include a control connection line 123 for electrical communications between the charger interface 130 and the charger 135, as well as any suitable number of control connection lines 121(A)-(N) for communications between the charger interface 130 and each of the BMS 120(A)-(N).

It can be advantageous to provide separate power lines to each of the battery submodules 110(A)-(N), as shown in FIG. 5, in order to electrically isolate the battery submodules 110(A)-(N) from one another and thereby reduce to possibility of failure or errors to propagate from one battery submodule to another battery submodule. For aviation purposes, it is advantageous to de-couple the power lines for the battery submodules 110(A)-(N), so that there is no common electrical bus on the aircraft during aircraft operation. If any failures occur, they are prevented from propagating to other battery submodules 110(A)-(N). If an error propagates along a common electric bus within the adaptor 140 when the aircraft 110 is on the ground charging, that is a lesser problem, as the aircraft 110 is already in a safe place and can be prevented from operating (e.g., taking flight).

Figure 6:
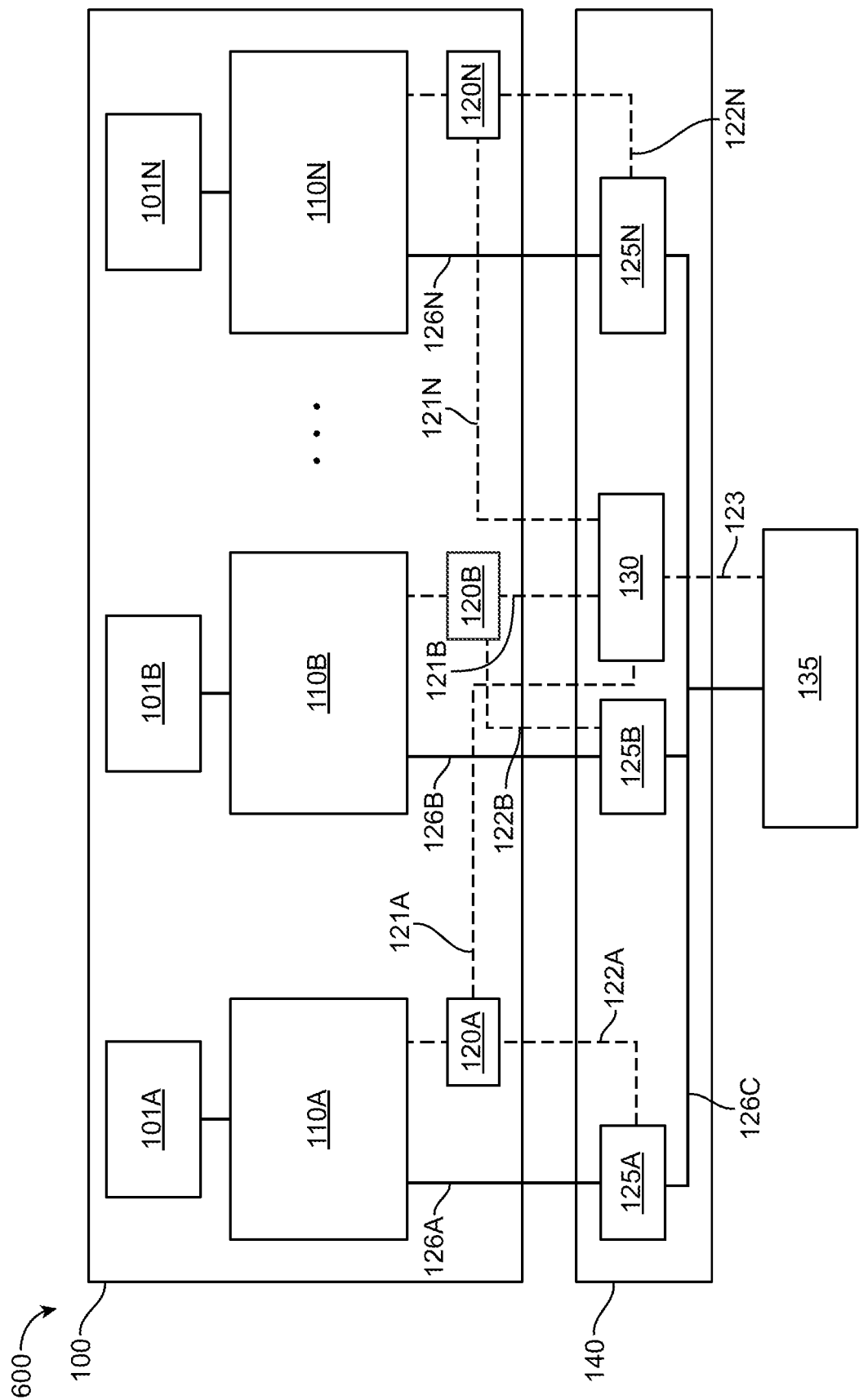
FIG. 6 illustrates a charging system where battery monitoring systems are in communication with power converters, according to various embodiments.

FIG. 6 illustrates another system 600 for simultaneously providing multiple custom battery-specific charging currents to different batteries from a set of multiple batteries, according to some embodiments. The system 600 in FIG. 6 is similar to the system 500 in FIG. 5, except the control connection lines 121(A)-(N) are rerouted to communicatively connect each BMS 120(A)-(N) and each respective power converter 125(A)-(N), instead of communicatively connecting the charger interface 130 to each respective power converter 125(A)-(N). In this case, a BMS 120(A)-(N) can directly communicate custom charging parameter instructions to a respective power converter 125(A)-(N), instead of the charger interface 130 providing the control instructions to the power converters 125(A)-(N). Further, a BMS 120(A)-(N) may be configured to determine the custom charging parameters, as discussed above for the charger interface 130 with respect to FIG. 3. Alternatively, the charger interface 130 may still determine the custom charging parameters but may relay the instructions through the BMS 120(A)-(N) to the power converters 125(A)-(N).

Figure 7:
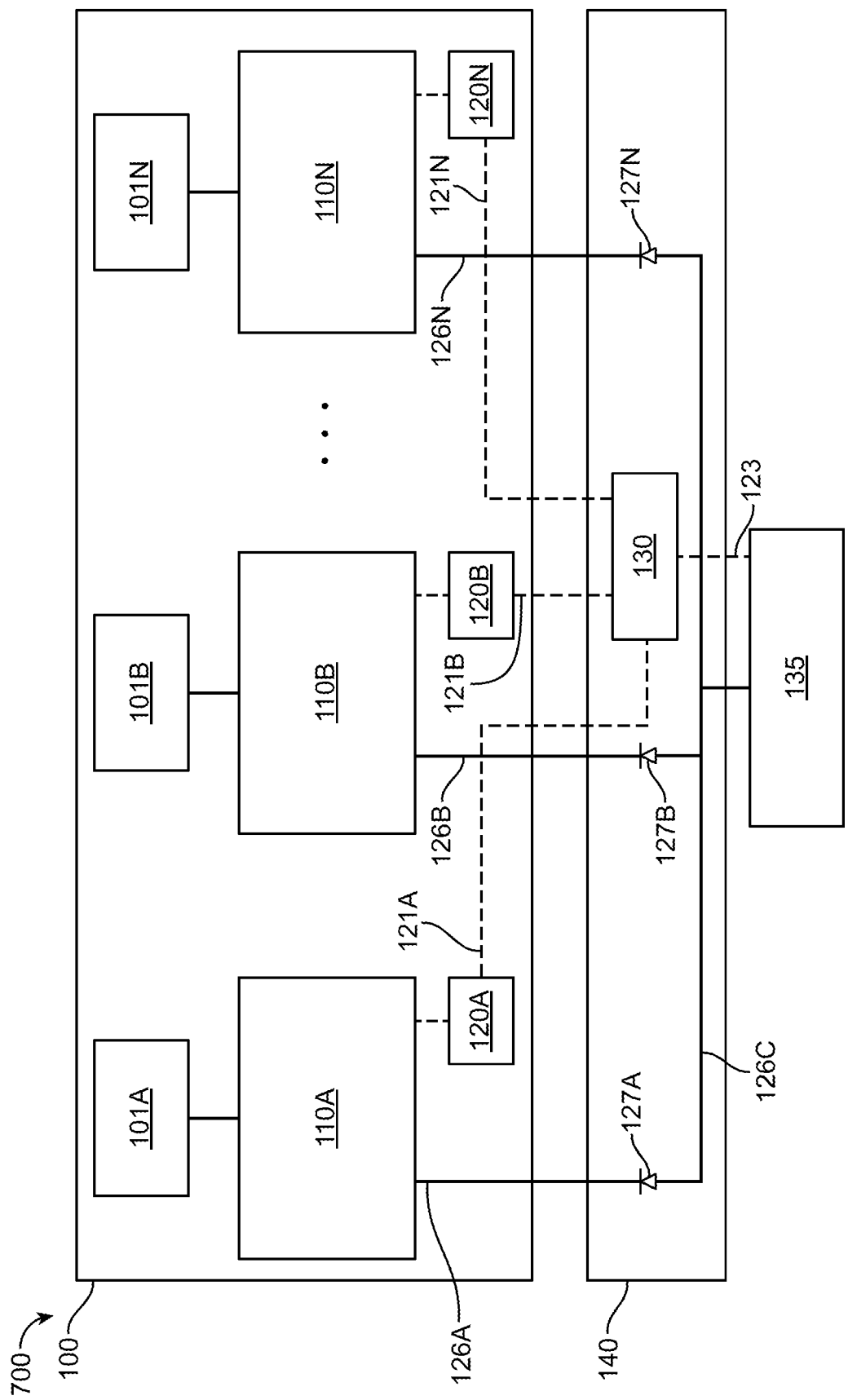
FIG. 7 illustrates a charging system with a set of diodes, according to various embodiments.

FIG. 7 shows a system 700 for recharging batteries, according to some embodiments. The system 700 in FIG. 7 is similar to the system 500 in FIG. 5, except that some components are modified to simplify the system 700. For example, in place of the power converters, the system 500 includes a set of diodes 127(A)-(N). Each of the diodes 127(A)-(N) allow current to flow directionally toward, but not away from, a respective battery submodule 110(A)-(N). As a result, the diodes 127(A)-(N) prevent charge from being shuttled out of one battery submodule to another battery submodule, as well as back toward the charger 135. This can be considered a passive control of the charging power, as the diodes 127(A)-(N) can function without requiring active control signals, as opposed to the power converters that receive control signals and actively divide the charging power.

Because the power converters are not included, the system 700 in FIG. 7 provides a reduction in system complexity, which can reduce cost, weight, and possible points of failure. In some situations, controllable battery-specific charging currents may not be necessary, so the power converters may not be needed. For example, in some embodiments, the battery submodules 110(A)-(N) may prefer similar charging currents. As a result, the charging power can be allowed to distribute naturally and/or equally instead of actively controlling and fine-tuning the charging current parameters for each of the battery submodules 110(A)-(N).

As shown in FIG. 7, the diodes 127(A)-(N) can be included in the adaptor 140. Additionally, the adaptor 140 can include wiring for splitting an input power connection line 126(C) from the charger 135 into multiple output power connection lines 126(A), 126(B), 126(N) leading to multiple battery submodules 110(A)-(N). As mentioned above, for aviation purposes, it is advantageous to de-couple the power lines for the battery submodules 110(A)-(N), so that there is no common electrical bus on the aircraft during aircraft operation.

In the embodiment shown in FIG. 7, the BMS 120(A)-(N) can still be configured to collect metrics from the battery submodules 110(A)-(N), and the charger interface 130 can still be configured to determine custom charging parameters for each of the battery submodules 110(A)-(N). The charger interface 130 also be configured to derive custom charging powers for each of the battery submodules 110(A)-(N) based on the custom charging currents and known corresponding battery submodule voltages, combine the custom charging powers from each of the battery submodules 110(A)-(N) to determine a total charging power, and then request the determined total charging power from the charger 135. The charger 135 can still be configured control the total supplied power (e.g., charging power). In other words, while power converters may not be present to subdivide the total charging power in an unequal and controlled manner, the charger 135 can still be instructed to provide a customizable and/or dynamic total charging power to the aircraft 110.

The charger interface 130 can be configured determine a total charging power to request from the charger 135 based on any suitable parameters. As mentioned above, the charger interface 130 can sum the individual custom charging powers. Alternatively, the charger interface 130 can determine a total charging power to request that will result in a certain one or subset of the battery submodules 110(A)-(N) receiving an optimal charging current. As another example, the charger interface 130 can determine a total charging power to request that will lead to all of the battery submodules 110(A)-(N) receiving individual charging currents that are considered safe for that battery submodule 110(A)-(N) (e.g., based on characteristics and metrics of that battery submodule).

Figure 8:
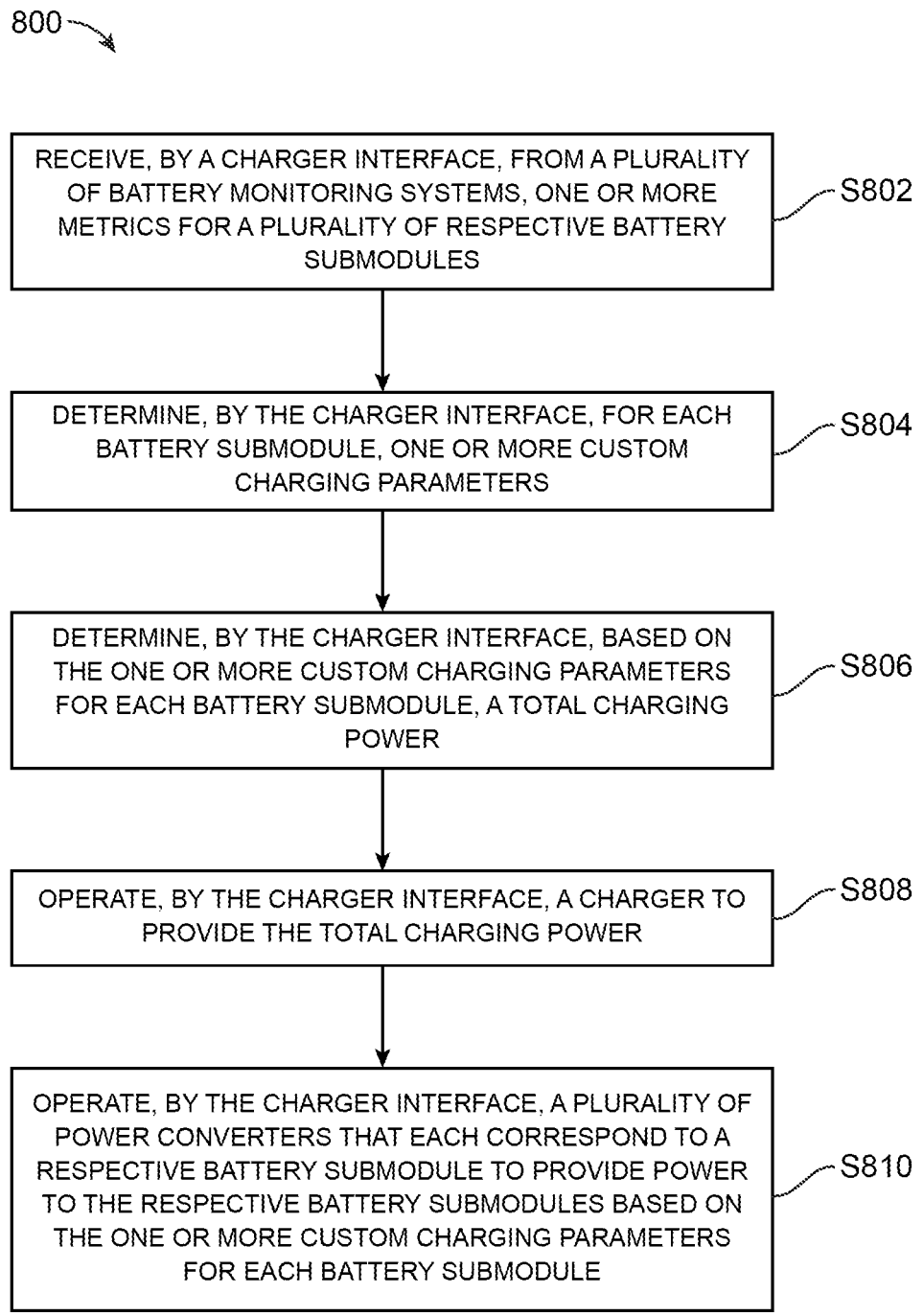
FIG. 8 depicts a diagram of a method, according to various embodiments.

FIG. 8 is a flowchart 600 illustrating an embodiment of a process to controllably charge a battery system with multiple battery submodules according to different sets of charging parameters.

An aircraft 100 may be coupled to a charger 135 to initiate a recharging process. A plurality of BMS 120(A)-(N) may measure or otherwise receive and collect one or more metrics for a paired respective battery submodule from a plurality of battery submodules 110(A)-(N). As examples, collected metrics may include metrics associated with battery health (e.g., instantaneous internal resistance, charge capacity, temperature, etc.), metrics associated with a battery's state of charge (e.g., a percentage associated with the degree to which the battery is charged, given that battery's storage capacity), derivative of voltage with respect to time given a known current, or any other suitable information associated with a battery or battery state.

At S802, a charger interface 130 may receive, from the plurality of BMS 120(A)-(N), the one or more metrics collected for each of the plurality of respective battery submodules 110(A)-(N). The BMS 120(A)-(N) may be in electronic communication with the charger interface 130, and may provide updated battery metrics continuously, periodically, when requested from the charger interface 130, or at any other suitable time or interval.

At S804, the charger interface 130 may determine, for each battery submodule, one or more custom charging parameters. For example, the charger interface 130 may determine an amount of current to apply for each battery submodule, an amount of time to apply charging current to each battery submodule, current as a function of time for each battery submodule, and/or any other suitable characteristics of a charging current. The determination of custom charging parameters may be based on the metrics received in Step S802.

The determination of custom charging parameters may be based on a certain set of priorities or considerations, which may be the same or different for each of the battery submodules 110(A)-(N), and which may be fixed, preset, and/or change over time. In some embodiments, determination of custom charging parameters may include first determining a set of one or more priorities or a top priority for a given battery submodule (e.g., based on metrics for that battery submodule or comparisons with the group of battery submodules), and then determining what charging parameters satisfy the set of priorities. For example, the charger interface 130 may determine that one or more top priorities for given battery submodule may be fast charging, battery health, and/or any other suitable consideration, and custom charging parameters may be selected that satisfy those one or more of those priorities or otherwise meet those criteria.

At S806, the charger interface 130 may determine a total charging power based on the one or more custom charging parameters for each of the battery submodules 110(A)-(N). For example, each set of custom charging parameters may include an amount of current. The charger interface 130 may also have, for each of the battery submodules 110(A)-(N), a voltage metric (e.g., as measured by a corresponding BMS 120(A)-(N)). The charger interface 130 may, for each of the battery submodules 110(A)-(N), combine the current amount parameter with the voltage metric to determine a power parameter. The charger interface 130 may then combine (e.g., calculate a sum of) the individual power parameters for each of the battery submodules 110(A)-(N) to determine the total charging power needed to satisfy each individual power parameter simultaneously. In some embodiments, the power parameters and/or the total charging power can be determined as a function of time (e.g., the power amount changes during a charging time period).

The charger interface 130 can then control a charging process, for example by operating the charger 135 and power converters 125(A)-(N) according to steps S808-S810. At S808, the charger interface 130 may operate the charger 135 to provide the total charging power. For example, a power supply of the charger 135 may be activated and set to provide at least the determined total charging power. The charger interface 130 may instruct the charger 135 by communicating information about the total charging power, or may have full control of the charger 135.

At S810, which can take place before, after, or at the same time as S808, the charger interface 130 may operate a plurality of power converters 125(A)-(N) that each correspond to a respective battery submodule of the plurality of battery submodules 110(A)-(N) to provide power to their respective battery submodules based on the one or more custom charging parameters for each battery submodule. For example, the power converters 125(A)-(N) can be operated to receive charging current from the charger 135, and individually modify the charging current according to the custom parameters for a respective battery submodule. As a result, each of the battery submodules 110(A)-(N) can be simultaneously charged with different charging currents according to their respective custom charging parameters, effectively distributing the total charging current unequally and in a controlled manner. The charger interface 130 may instruct the power converters 125(A)-(N) by communicating information about the custom charging parameters to each of the power converters 125(A)-(N), or may have full control of the power converters 125(A)-(N).

The process of FIG. 8 may be repeatedly and/or continuously performed if desired so that custom charging parameters can be updated and changed over time. For example, the process of FIG. 8 may be performed a first time when the aircraft 100 and charger 135 are first coupled together in order to select an initial set of charging parameters. As charging occurs, the process can be continuously and/or repeatedly performed to provide an updated set of custom charging parameters and/or an updated total charging power based on real-time and/or periodically updated battery metrics.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A system comprising:
    an aircraft including:
        one or more propulsion systems;
        a plurality of battery submodules, where each of the plurality of battery submodules is electrically coupled to one or more of the one or more propulsion systems; and
        one or more battery monitoring systems, each of which is configured to collect one or more battery metrics for a respective battery submodule of the plurality of battery submodules;
    a charger configured to provide electric power the plurality of battery submodules; and
    a charger interface coupled to the aircraft and the charger, the charger interface including:
        a processor; and
        a memory coupled with the processor, wherein the memory is configured to provide the processor with instructions which when executed cause the processor to:
            receive, from each of the one or more battery monitoring systems, the one or more battery metrics for the respective battery submodule of the plurality of battery submodules;
            determine, for each of the plurality of battery submodules, a set of one or more custom charging parameters for the battery submodule based on the one or more battery metrics for the battery submodule;
            determine a total charging power based on a plurality of sets of one or more custom charging parameters, where each set of one or more custom charging parameters corresponds to a respective battery submodule of the plurality of battery submodules;
            operate the charger to provide the total charging power to a plurality of power converters;
            operate the plurality of power converters to distribute the total charging power to one or more of the plurality of battery submodules according to the plurality of sets of one or more custom charging parameters;
            receive, from each of the one or more battery monitoring systems, one or more updated battery metrics for the respective battery submodule of the plurality of battery submodules;
            determine, for each of the plurality of battery submodules, an updated set of one or more custom charging parameters for the battery submodule based on the one or more updated battery metrics for the battery submodule;
            determine an updated total charging power based on the updated sets of one or more custom charging parameters:
            operate the charger to provide the updated total charging power; and
            operate the plurality of power converters to distribute the updated total charging power to the plurality of battery submodules according to the updated sets of one or more custom charging parameters.

2. The system of claim 1, wherein the total charging power is distributed to the plurality of battery submodules unequally.

3. The system of claim 1, wherein each of the plurality of sets of one or more custom charging parameters include a custom current amount for a corresponding battery submodule of the plurality of battery submodules.

4. The system of claim 3, wherein the custom current amount is a function of time.

5. The system of claim 3, wherein the plurality of power converters are DC-to-DC converters, and wherein operating the plurality of power converters to distribute the total charging power to one or more of the plurality of battery submodules includes individually operating each of the plurality of power converters to modify an input electric current received from the charger into an output electric current according to the custom current amount for the corresponding battery submodule.

6. The system of claim 5, further comprising:
    an adaptor coupled to the aircraft and the charger, wherein the adaptor including:
        the charger interface; and
        the plurality of power converters.

7. The system of claim 1, wherein determining, for each of the plurality of battery submodules, the set of one or more custom charging parameters for the battery submodule includes:
    determining at least one priority for the battery submodule; and
    determining the set of one or more custom charging parameters that satisfy the priority.

8. The system of claim 7, wherein the at least one priority includes at least one of maximizing recharging speed and minimizing battery degradation.

9. The system of claim 1, further comprising:
    a plurality of control connection lines between each of the one or more battery monitoring systems and the charger interface, between each of the power converters and the charger interface, and between the charger and the charger interface; and
    a plurality of power connection lines between each of the plurality of power converters and their respective battery submodules, and between the charger and each of the plurality of power converters.

10. An adaptor comprising:
    a plurality of DC-to-DC power converters; and
    a charger interface comprising:
        a processor; and
        a memory coupled with the processor, wherein the memory is configured to provide the processor with instructions which when executed cause the processor to:

determine a total charging power based on a plurality of sets of one or more custom charging parameters each including include a custom current amount, where each set of one or more custom charging parameters corresponds to a respective battery submodule of a plurality of battery submodules included in an aircraft, wherein each of the plurality of battery submodules is electrically coupled to one or more propulsion systems of the aircraft;

operate a charger to provide the total charging power to the plurality of DC-to-DC power converters; and operate the plurality of DC-to-DC power converters to distribute the total charging power to one or more of the plurality of battery submodules according to the plurality of sets of one or more custom charging parameters including individually operating each of the plurality of DC-to-DC power converters to modify an input electric current received from the charger into an output electric current according to the custom current amount.

11. The charger interface of claim 10, wherein the total charging power is distributed to the plurality of battery submodules unequally.

12. A method comprising:
receiving, by a charger interface, from each of one or more battery monitoring systems, one or more battery metrics for a respective battery submodule of a plurality of battery submodules;

determining, by the charger interface, for each of the plurality of battery submodules, based on the one or more battery metrics for the battery submodule, a set of one or more custom charging parameters for the battery submodule;

determining, by the charger interface, a total charging power based on the plurality of sets of one or more custom charging parameters, where each set of one or more custom charging parameters corresponds to a respective battery submodule of the plurality of battery submodules included in an aircraft;

operating, by the charger interface, a charger to provide the total charging power to a plurality of power converters;

operating, by the charger interface, the plurality of power converters to distribute the total charging power to one or more of the plurality of battery submodules according to the plurality of sets of one or more custom charging parameters;

receiving, by the charger interface, from each of the one or more battery monitoring systems, one or more updated battery metrics for the respective battery submodule of the plurality of battery submodules; and determining, by the charger interface, for each of the plurality of battery submodules, an updated set of one or more custom charging parameters for the battery submodule based on the one or more updated battery metrics for the battery submodule;

determining, by the charger interface, an updated total charging power based on the updated sets of one or more custom charging parameters;

operating, by the charger interface, the charger to provide the updated total charging power to the plurality of power converters; and operating, by the charger interface, the plurality of power converters to distribute the updated total charging power to the plurality of battery submodules according to the updated sets of one or more custom charging parameters.

13. The method of claim 12, wherein determining, for each of the plurality of battery submodules, the set of one or more custom charging parameters for the battery submodule includes optimizing a recharging process for the battery submodule.

14. The method of claim 13, wherein optimizing the recharging process includes determining a balance between maximizing recharging speed and minimizing battery degradation.

* * * * *